United States Patent [19]

Gamo et al.

[11] Patent Number: 5,045,661
[45] Date of Patent: Sep. 3, 1991

[54] WIRE ELECTRODE GUIDE APPARATUS IN A WIRE-CUT ELECTRIC DISCHARGE MACHINE

[75] Inventors: Gotaro Gamo, Hachioji; Toshiyuki Aso, Oshino; Sadahiro Watanabe, Kunitachi, all of Japan

[73] Assignee: Fanuc Ltd, Minamitsuru, Japan

[21] Appl. No.: 432,773

[22] PCT Filed: Mar. 15, 1989

[86] PCT No.: PCT/JP89/00281

§ 371 Date: Nov. 3, 1989

§ 102(e) Date: Nov. 3, 1989

[87] PCT Pub. No.: WO89/08526

PCT Pub. Date: Sep. 21, 1989

[30] Foreign Application Priority Data

Mar. 15, 1988 [JP] Japan ................... 63-59228

[51] Int. Cl.⁵ ............................................. B23H 7/10
[52] U.S. Cl. ................................ 219/69.12; 219/69.14
[58] Field of Search ........................ 219/69.12, 69.14; 204/224 M

[56] References Cited

U.S. PATENT DOCUMENTS

| | | | |
|---|---|---|---|
| 4,564,431 | 1/1986 | Miyano | 219/69.12 |
| 4,740,667 | 4/1988 | Obara | 219/69.12 |

FOREIGN PATENT DOCUMENTS

| | | |
|---|---|---|
| 133288 | 9/1979 | Japan . |
| 130129 | 6/1987 | Japan . |
| 157725 | 7/1987 | Japan . |
| 271630 | 11/1987 | Japan .................... 219/69.14 |
| 297025 | 12/1987 | Japan .................... 219/69.12 |
| 8703521 | 6/1987 | PCT Int'l Appl. ........ 219/69.12 |

Primary Examiner—Geoffrey S. Evans
Attorney, Agent, or Firm—Staas & Halsey

[57] ABSTRACT

A wire electrode guide apparatus (1) in a wire-cut electric discharge machine includes a switch valve (80) for supplying pressurized air and preventing the supply of the air to an air pressure-operated actuator (70) for driving a movable piece (40) for three point-support of a wire electrode (3) between the movable piece and a stationary piece. During wire extension, an air supply port (88) of the switch valve is communicated to a switch port (87) thereof through which the pressurized air is supplied to the actuator to move a piston rod (73) of the actuator away from the movable piece to release an urging force acting upon the same, resulting in easy insertion of the wire electrode between the stationary and movable pieces. During electric discharge machining, the switch port is disconnected from the pressurized air supply port to prevent the air supply to the actuator, so that the movable piece is urged by the actuator for wire support. A highly pressurized working fluid injected from a nozzle (51) and penetrating into the actuator through gaps between apparatus components is discharged outside the apparatus through the switch port and a pressure relief port (89) in communication therewith, so that the actuator is prevented from decreasing the urging force acting upon the movable piece to thereby accurately support the wire electrode on a predetermined traveling path.

8 Claims, 2 Drawing Sheets

WIRE ELECTRODE GUIDE APPARATUS IN A WIRE-CUT ELECTRIC DISCHARGE MACHINE

TECHNICAL FIELD

The present invention relates to a wire electrode guide apparatus for use in a wire-cut electric discharge machine having an automatic wire extension function, and more particularly to a three-point support type wire electrode guide apparatus which is capable of accurately supporting a wire electrode on a predetermined wire traveling path to improve machining accuracy.

BACKGROUND ART

In a wire-cut electric discharge machine arranged to effect electric discharge machining by producing electric discharge between a workpiece and a wire electrode (hereinafter referred to as wire), generally, the wire is supported and guided on a predetermined wire traveling path by the use of upper and lower guides which are respectively disposed above and below the workpiece, and at the same time, a working fluid is supplied between the workpiece and the wire from a nozzle hole formed in a nozzle which is attached to a housing of each guide integrally therewith so as to cool the wire and eliminate chips resulting from machining. Conventionally, in order to support the wire on the predetermined wire traveling path in a stable manner, a guide of a type having a V-shaped stationary piece (or a V-shaped groove) and a movable piece arranged to be pressed by an operating member of an actuator toward the stationary piece is employed for three-point supporting the wire by the movable and stationary pieces.

However, in the three-point support guide of the above-mentioned kind, a highly pressurized working fluid filled between the housing and the nozzle can penetrate into the interior of the actuator and act upon the operating member of the actuator so as to cause the operating member to be displaced from its predetermined wire support position in the direction away from the stationary piece. In this case, the actuator cannot apply a predetermined urging force on the wire via the movable piece of the three-point support guide, so that the wire cannot be accurately supported on the predetermined wire traveling path.

DISCLOSURE OF THE INVENTION

The object of the present invention is to provide a wire electrode guide apparatus in a wire-cut electric discharge machine, which is capable of accurately supporting the wire on a predetermined wire traveling path to improve machining accuracy.

In order to achieve the above object, according to the present invention, a wire electrode guide apparatus in a wire-cut electric discharge machining comprises a guide body; a movable guide member disposed to be movable toward and away from the guide body for cooperating with the guide body to support a wire electrode; a fluid supply source for supplying a pressurized fluid; a fluid-operated actuator having a fluid-supplied section for receiving the pressurized fluid and an operating member arranged to apply an urging force to the movable guide member and release the urging force in response to prevention of and permission of supply of the pressurized fluid to the fluid-supplied section; switch means for causing the fluid-supplied section of the fluid-operated actuator to be selectively communicated to either one of the fluid supply source and outside the wire electrode guide apparatus; and a nozzle disposed opposite the guide body and formed with a nozzle hole for injecting a working fluid.

As mentioned above, according to the present invention, the fluid-supplied portion of the fluid-operated actuator for driving the movable guide member for supporting the wire electrode between itself and the guide body is arranged to be selectively communicated to either one of the fluid supply source and outside the wire electrode guide apparatus. Therefore, during electric discharge machining, even when a highly-pressurized working fluid filled in the interior of the wire electrode guide apparatus penetrates into the fluid-supplied section of the fluid-operated actuator, the thus penetrating working fluid can be discharged to the outside of the apparatus so as to prevent the fluid-operated actuator from operating in a direction releasing the urging force acting upon the movable guide member. In this manner the wire can be always accurately supported on a predetermined wire traveling path during electric discharge machining to attain an improved machining accuracy.

BEST MODE OF CARRYING OUT THE INVENTION

Figure 1:
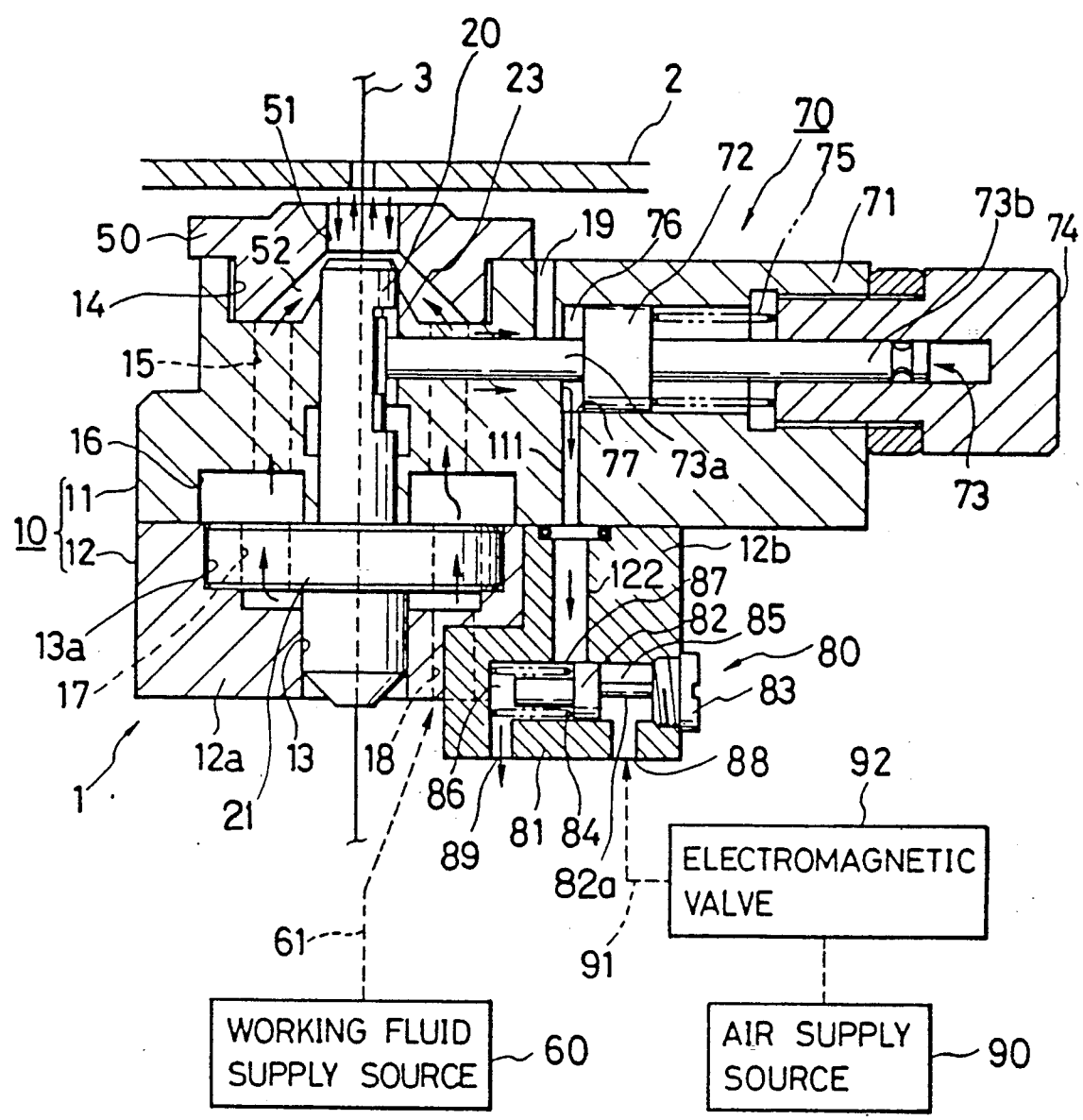
FIG. 1 is a schematic sectional front view showing a three-point support type wire electrode guide apparatus according to an embodiment of the present invention.

Referring to FIG. 1, a three-point support type wire electrode guide apparatus 1 (hereinafter referred to as wire guide apparatus), according to an embodiment of the present invention is shown which is mounted on a wire-cut electric discharge machine and is disposed below a workpiece 2, for instance, so as to be employed as a lower guide which forms part of a working fluid injection type automatic wire extension mechanism of the electric discharge machine. The wire guide apparatus 1 comprises a housing 10 which consists of upper and lower housings 11, 12 which are integrally fixed to each other by an appropriate means, not shown. Fitted within a central bore 13, formed in the upper and lower housings 11, 12 along a predetermined traveling path of a wire 3, is a guide body 20 which has a flange 21 fitted in a large-diameter portion 13a of the central bore 13. Meanwhile, in the present embodiment, the lower housing 12 consists of two lower housing sections 12a and 12b.

Figure 2:
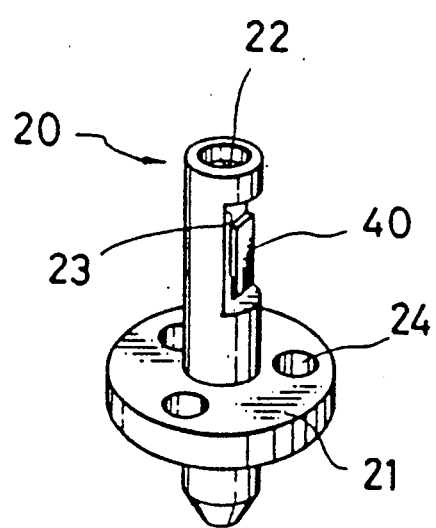
FIG. 2 is an enlarged perspective view showing a guide body.
Figure 3:
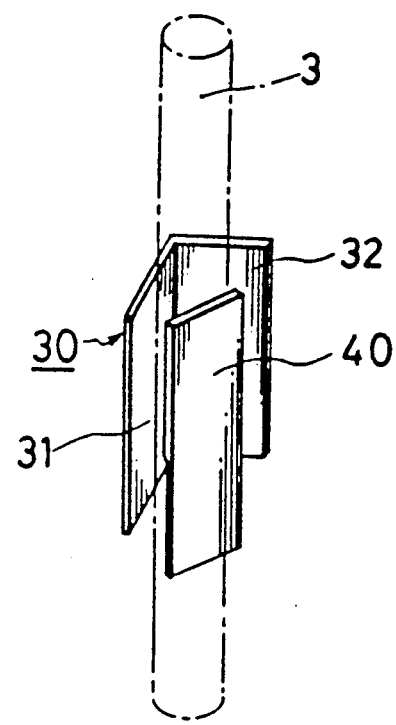
FIG. 3 is an enlarged perspective view showing a movable piece and a stationary piece, with a wire supported between these pieces.

As shown in FIG. 2, the guide body 20 is formed with a wire guide hole 22 passing therethrough along an axis thereof for receiving the wire 3, and has a peripheral wall which is formed at one side with a groove 23 at an intermediate axial portion of the guide body. Reference numeral 24 denotes working fluid passage holes formed in the flange 21 of the guide body 20. As shown in FIGS. 2 and 3, mounted in the groove portion of the guide body 20 is a V-shaped stationary piece 30 having two halves 31 32 which are formed integrally with each other and define a predetermined angle therebetween. A movable piece (movable guide member) 40, which is comprised of a plate spring, for instance, is disposed opposite the stationary piece 30. The movable piece 40 is fixed at its lower end to the peripheral wall of the guide body 20 and is supported by the guide body 20 to be movable toward and away from the stationary piece 30, i.e., horizontally movable, so that the wire 3 is three-point supported by the stationary and movable pieces 30, 40. In the meantime, the guide body 20 may be formed with a V-shaped groove (not shown) in place of the stationary piece 30.

Fitted in a large-sized bore 14, formed in an upper face of the upper housing 11 of the wire guide apparatus 1, is a nozzle member 50 having a nozzle hole 51 formed therein in alignment with the axis of the guide body 20 for injecting a working fluid toward a workpiece 2, the nozzle member 50 cooperating with the upper housing 11 and the guide body 20 to define a working fluid receiving space 52. Further, the upper housing 11 is formed with holes 15 and an annular groove 16 coaxially with the central bore 13, with each of the holes 15 having an outer end communicating with the space 52. The annular groove 16 is in communication the respective inner ends of the holes 15 and with the working fluid passage holes 24 of the flange 21 of the guide body 20. The lower housing section 12a is formed with an annular groove 17 communicating with the holes 24 of the flange 21 and a hole 18 having an inner end communicating with the annular groove 17 and an outer end connected to a working fluid supply source 60 through a pipe 61. That is, the apparatus is arranged such that the working fluid from the working fluid supply source 60 is supplied between the workpiece 2 and the wire 3 through the medium of the above-mentioned various elements 15–18, 51, 52 and 61.

Also mounted on the housing 10 is a fluid-operated actuator, e.g., a piston and cylinder type air pressure-operated actuator 70 for driving the movable piece 40 toward and away from the stationary piece 30. The actuator 70 comprises a cylinder 71 which is formed integrally with the upper housing 11 and in which a piston 72 is slidably disposed. A piston rod 73 is fixed to the piston 72 integrally therewith in a so as to be horizontally movable in unison with the piston 72, the piston rod 73 cooperating with the piston 72 to serve as an operating member of the actuator 70. The piston rod 73 has one half 73a at the side facing the guide body 20, which is arranged to be in and out of urged contact with the movable piece 40, and another half 73b, remote from the guide body 20, which is supported in an axial bore 74a of a support member 74 in a manner slidable therein, the support member 74 being threadedly fixed to the cylinder 71. Reference numeral 75 denotes a spring interposed between the piston 72 and the support member 74, which urges the piston 72 toward the guide body 20. A cylinder chamber (fluid-supplied section) 76, defined by the cylinder 71 and the piston 72, is formed with a pressurized air supply port 77 which is communicated with a pressurized air (pressurized fluid) passage 111 formed in the cylinder forming portion of the upper housing 11.

Reference numeral 80 designates a switch valve of a piston and cylinder type, which comprises a cylinder 81 formed integrally with the lower housing section 12b. Slidably disposed within the cylinder 81 is a piston-like valve body 82 which has an extension portion 82a whose tip end is arranged to be in and out of contact with a cap member 83. A spring 84 is interposed between the cylinder 81 and the valve body 82 so as to urge the valve body 82 toward the cap member 83. The cylinder 81 cooperates with the valve body 82 and the cap member 83 to define a first cylinder chamber 85, and further cooperates with the valve body 82 to define a second cylinder chamber 86 at the side remote from the first cylinder chamber 85 with respect to the valve body 82. Further, the cylinder 81 is formed with a switch port 87 communicated with a pressurized air passage 112 which is formed in the lower housing section 12b coaxially with the pressurized air passage 111 formed in the upper housing 11. Moreover, the lower housing section 12b is formed at its cylinder forming portion with a pressurized air supply port 88 and a pressure relief port 89. The pressurized air supply port 88 has an inner end opening to the first cylinder chamber 85 and an outer end connected to a pressurized air supply source (fluid supply source) 90 through a pipe 91 in which an electromagnetic valve 92, cooperating with the switch valve 80 to form switching means, is interposedly provided. The pressure relief port 89 has opposite ends opening to the second cylinder chamber 86 and an outer surface (outside the wire guide apparatus) of the lower housing section 12b, respectively.

Reference numeral 19 denotes a pressure relief hole formed in the upper housing 11 and having opposite ends opening to a sliding peripheral surface of the piston rod half 73a and an upper surface (outside the apparatus) of the cylinder 71, respectively.

In the following, operation of the wire guide apparatus 1 constructed as mentioned above will be explained. Upon start of automatic wire extension, the electromagnetic valve 92 interposed in the pipe 91 is opened in response to a command supplied from a controller (not shown) of the electric discharge machine, so that a pressurized air is supplied from the pressurized air supply source 90 to the first cylinder chamber 85 of the switch valve 80 through the pipe 91 and the pressurized air supply port 88 of the switch valve 80. As a result, the valve body 82 of the switch valve 80 is displaced from its position shown in FIG. 1 in the direction away from the cap member (i.e., to the left in FIG. 1) against the force produced by the spring 84, so that the first cylinder chamber 85 is brought into communication with the switch port 87. Accordingly, the pressurized air from the pressurized air supply source 90 is supplied to the cylinder chamber 76 of the air-operated actuator 70 through the above-mentioned various elements 91, 88, 85, 87, 112, 111 and 77. As a result, the piston 72 of the actuator 70 and the piston rod 73 movable in unison therewith are displaced in the direction away from the guide body 20 (i.e., to the right in FIG. 1) against the spring force of the spring 75 so that the tip end of the piston rod half 73a is moved away from the movable piece 40. Thus, the urging force of the actuator 70 acting upon the movable piece 40 is released so that the wire 3 can be easily inserted between the stationary piece 30 and the movable piece 40. Under this condition, automatic wire extension is carried out in a conventional manner.

During electric discharge machining after completion of the automatic wire extension, the electromagnetic valve 92 is closed in response to a command from the controller, so that the supply of the pressurized air to the first cylinder chamber 85 of the switch valve 80 is prevented. As a result, the valve body 82 of the switch valve 80 is displaced to the right in FIG. 1 from its automatic wire extension position by the urging force of the spring 84 to assume the position shown in FIG. 1 so as to prevent the supply of the pressurized air to the cylinder chamber 76 of the actuator 70. Thus, the piston 72 and the piston rod 73 of the actuator 70 are displaced from their wire extension positions to the left in FIG. 1 by the urging force generated by the spring 75, so that the tip end of the piston rod half 73a is brought into urged contact with the movable piece 40. As a consequence, the urging force of the actuator 70 is applied to the movable piece 40, so that the wire 3 is three-point supported by the stationary and movable pieces 30, 40.

On the other hand, the working fluid from the working fluid supply source 60 is supplied to the nozzle hole 51 through the above-mentioned various elements 15–18, 52 and 61 and injected therefrom between the workpiece 2 and the wire 3. Typically, the nozzle 50 and the workpiece 2 are disposed close to each other with a small distance on the order of 1–2 mm, and the working fluid receives a great discharge resistance, whereas the supply pressure of the working fluid, up to approximately 15 atmosphere, is large. As a result, the space 52 into which the working fluid flows and other spaces are filled with a highly pressurized working fluid which can penetrate into the cylinder chamber 76 of the actuator 70 through gaps between various components of the wire guide apparatus 1. For instance, the working fluid flows into the groove 23 of the guide body 20 through the upper open end of the wire guide hole 22 of the guide body 20 communicated with the space 52, and then penetrates into the cylinder 76 through the gap between the sliding surfaces of the piston rod half 73a and the upper housing 11.

In order to clarify the operation of the wire guide apparatus 1, problems which occur when the working fluid flows into the air pressure-operated actuator 70 of the conventional arrangement which is similar in basic construction to the apparatus 1 will now be discussed.

During electric discharge machining, although part of the working fluid which penetrates into the gap between the piston rod half 73a of the actuator 70 and the upper housing 11 is discharged to the outside of the apparatus through the pressure relief hole 19, most part thereof flows into the cylinder chamber 76 and the pressurized air passages 111, 112. Since the electromagnetic valve 92 is closed during electric discharge machining, the cylinder chamber 76 is gradually filled with the working fluid and the pressure within the cylinder chamber increases. With the increase in cylinder chamber pressure, the piston 72 and the piston rod 73 are displaced against the urging force of the spring 75 in the direction away from the guide body from their wire supporting positions shown in FIG. 1. As a result, the actuator 70 fails to apply a predetermined urging force on the wire 3, and hence the wire 3 cannot be accurately supported on a predetermined wire traveling path. Meanwhile, from the view point of preventing leakage of the pressurized air supplied to the cylinder chamber 76 for automatic wire extension, the inner diameter of the pressure relief hole 19 should be kept smaller than an appropriate upper limit, and accordingly, the working fluid cannot be sufficiently prevented from flowing into the cylinder chamber 76 during electric discharge machining by increasing the inner diameter of the pressure relief hole 19.

Now returning to the explanation of the wire guide apparatus 1, the working fluid flows into the cylinder chamber 76 of the actuator 70 during electric discharge machining, as mentioned above. At this time, the valve body 82 of the switch valve 80 assumes its position shown in FIG. 1. In other words, the outer end of the pressurized air passage 112 is communicated with the outside of the wire guide apparatus 1 through the switch port 87, second cylinder chamber 86 and pressure relief port 89 of the switch valve 80. Thus, the cylinder chamber 76 is communicated with outside the wire guide apparatus 1. As a result, the highly pressurized working fluid, flowing into the cylinder chamber 76, is discharged to the outside of the wire guide apparatus 1 through the pressurized air supply port 77 of the cylinder chamber 76, the pressurized air passages 111, 112 and various other elements 86, 87, 89 mentioned above. As a result, the cylinder chamber 76 of the actuator 70 will never be filled with the working fluid and the pressure within the same chamber never increases. As a consequence, the piston 72 and the piston rod 73 of the actuator 70 are held at their predetermined wire supporting positions by the urging force of the spring 75, so that the wire 3 is always three-point supported by the stationary and movable pieces 30, 40 on a predetermined wire traveling path accurately, resulting in electric discharge machining performed with high accuracy.

We claim:

1. A wire electrode guide apparatus for use in a wire-cut electric discharge machine, comprising:
   a guide body adapted to receive a wire electrode;
   a movable guide member disposed to be movable toward and away from said guide body for cooperating with said guide body to support said wire electrode;
   a fluid supply source for supplying a pressurized fluid;
   a fluid-operated actuator having a fluid-supplied section for receiving the pressurized fluid and an operating member arranged to apply an urging force to said movable guide member and release the urging force in response to prevention of and permission of supply of the pressurized fluid; respectively, to the fluid-supplied section;
   switch means for causing said fluid-supplied section of said fluid-operated actuator to be selectively communicated to either one of said fluid supply source and to the outside of said wire electrode guide apparatus; and
   a nozzle disposed adjacent one end of said guide body and formed with a nozzle hole for injecting a working fluid toward a workpiece.

2. An apparatus according to claim 1, wherein said fluid-operated actuator has a cylinder, a piston slidably disposed in said cylinder and integrally provided with a piston rod for cooperating with said piston to serve as said operating member, and a spring interposed between said piston and said cylinder, said piston and said cylinder defining a cylinder chamber serving as said fluid-supplied section at a side opposite said spring with respect to said piston.

3. An apparatus according to claim 1 or 2, wherein said fluid supply source is a pressurized air supply source for supplying a pressurized air as the pressurized fluid, and said fluid-operated actuator is an air pressure-operated actuator.

4. An apparatus according to claim 1, wherein said switch means has a fluid-supplied section for receiving the pressurized fluid, an operating member arranged to selectively communicate said fluid-supplied section to either one of said fluid supply source and to the outside of said wire electrode guide apparatus in response to permission of and prevention of supply of the pressurized fluid, respectively, to said fluid-supplied section of said switch means, and a control valve interposed between said fluid-supplied section of said switch means and said fluid supply source for selecting either the supply of the pressurized fluid to said fluid-supplied section of said switch means or the prevention thereof.

5. An apparatus according to claim 4, wherein said switch means includes a switch valve having: a cylinder which is formed with a switch port, a fluid-supply port communicated with said control valve, and a pressure relief port; a valve body slidably disposed in said cylinder and having an extension portion and serving as said operating member of said switch means; a cap member; and a spring interposed between said valve body and said cylinder of said switch valve at a side opposite said cap member with respect to said valve body; said extension portion of said valve body having a tip end arranged to be in and out of contact with said cap member; said cylinder, said valve body and said cap member defining a first cylinder chamber which serves as said fluid-supplied section of said switch means and which is communicated with said fluid-supply port; said cylinder and said valve body defining a second cylinder at a side opposite said first cylinder chamber with respect to said valve body and which is communicated with said pressure relief port; said switch port being communicated with either one of said first and second cylinder chambers in response to a sliding position of said valve body.

6. An apparatus according to claim 4 or 5, wherein said fluid supply source is a pressurized air supply source for supplying a pressurized air serving as said pressurized fluid, and said fluid-supplied section of said switch means is a pressurized air-supplied section.

7. An apparatus according to claim 1, wherein said movable guide member comprises a plate spring.

8. An apparatus according to claim 1, wherein said guide body is provided with a V-shaped groove for cooperation with said movable guide member to provide three-point support for said wire electrode.e

* * * * *

UNITED STATES PATENT AND TRADEMARK OFFICE
CERTIFICATE OF CORRECTION

PATENT NO. : 5,045,661
DATED : September 3, 1991
INVENTOR(S) : GOTARO GAMO, TOSHIYUKI ASO and SADAHIRO WATANABE It is certified that error appears in the above-identified patent and that said Letters Patent is hereby corrected as shown below:

[57] ABSTRACT, line 1, after "(1)" insert --for use--.

Column 3, line 21, after "communication" insert --with--;
\*          line 41, after "a" insert --manner--.

Column 4, line 20, "and." should be --and--.

Column 8, line 20, " electrode .e" should be --electrode.--

Signed and Sealed this

Sixteenth Day of February, 1993

Attest:

STEPHEN G. KUNIN

*Attesting Officer*      *Acting Commissioner of Patents and Trademarks*